US010099541B2

(12) United States Patent
Baccouche et al.

(10) Patent No.: US 10,099,541 B2
(45) Date of Patent: Oct. 16, 2018

(54) VEHICLE DOOR REINFORCING BEAM

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/357,183

(22) Filed: Nov. 21, 2016

(65) Prior Publication Data
US 2018/0141415 A1    May 24, 2018

(51) Int. Cl.
| | | |
|---|---|---|
| *B60J 5/04* | (2006.01) | |
| *B29C 70/06* | (2006.01) | |
| *B60J 5/00* | (2006.01) | |
| *B29C 70/30* | (2006.01) | |
| *B29C 65/00* | (2006.01) | |
| *B29K 105/08* | (2006.01) | |
| *B29L 31/30* | (2006.01) | |
| *B29L 9/00* | (2006.01) | |

(52) U.S. Cl.
CPC ....... *B60J 5/0443* (2013.01); *B29C 66/73754* (2013.01); *B29C 70/06* (2013.01); *B29C 70/30* (2013.01); *B60J 5/0425* (2013.01); *B29K 2105/0872* (2013.01); *B29L 2009/00* (2013.01); *B29L 2031/3055* (2013.01)

(58) Field of Classification Search
CPC ....... B60J 5/0443; B60J 5/0425; B29C 70/06; B29C 70/30; B29C 66/73754; B29L 2009/00; B29L 2031/3055; B29K 2105/0872
USPC ...................................... 296/146.6
See application file for complete search history.

(56) References Cited

U.S. PATENT DOCUMENTS 5,314,228 A *  5/1994  Figge, Sr. ............. B60J 5/0447
                                                  296/146.6
5,540,016 A     7/1996  Clausen
                              (Continued)

FOREIGN PATENT DOCUMENTS

| CN | 103921655 A | 7/2014 |
|---|---|---|
| DE | 102011054311 A1 | 4/2013 |

(Continued)

*Primary Examiner* — Joseph D. Pape
*Assistant Examiner* — Dana D. Ivey
(74) *Attorney, Agent, or Firm* — Jason C. Rogers; Bejin Bieneman PLC

(57) ABSTRACT

A vehicle door including a door inner and a reinforcing beam fixed to the door inner. The reinforcing beam includes a first layer and a second layer bonded to each other. The first layer includes a polymer and fibers impregnated in the polymer and extending continuously across the polymer of the first layer. The first layer extends along an axis and has first and second ends spaced from each other on the axis. The second layer includes a polymer and fibers impregnated in the polymer and extending continuously across the polymer of the second layer. The second layer has first and second ends spaced from each other on the axis. The first and second ends of the second layer are each disposed between the first and second ends of the first layer along the axis.

20 Claims, 5 Drawing Sheets

(56) References Cited

U.S. PATENT DOCUMENTS 6,883,843 B2 * 4/2005 Van Damme ........... B29C 70/46
                                                293/102
8,870,261 B2 10/2014 Ito
9,290,212 B2 3/2016 Zaluzec et al.

FOREIGN PATENT DOCUMENTS

DE     102012002917 A1   8/2013
JP          5106775 B2  12/2012

* cited by examiner

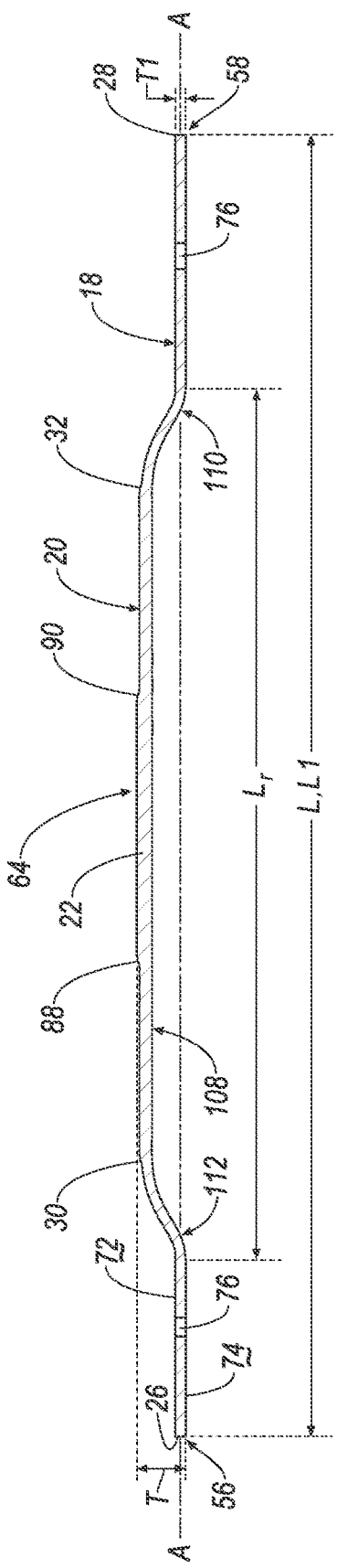

VEHICLE DOOR REINFORCING BEAM

BACKGROUND

A door of a vehicle may include a reinforcing beam extending through a cavity of the door. The reinforcing beam may be impacted during an impact of the vehicle, e.g., a side impact, and may reduce the likelihood of intrusion into the passenger compartment of the vehicle during the impact. The reinforcing beam is manufactured from a metallic structure, e.g., steel, aluminum, etc.

BRIEF DESCRIPTION OF THE DRAWINGS

FIG. 4 is a cross sectional view of the reinforcing beam along line 4.

FIG. 5 is a cross sectional view of the reinforcing beam along line 5 including a plurality of fibers impregnated in a polymer and extending along the reinforcing beam.

DETAILED DESCRIPTION

Figure 1:
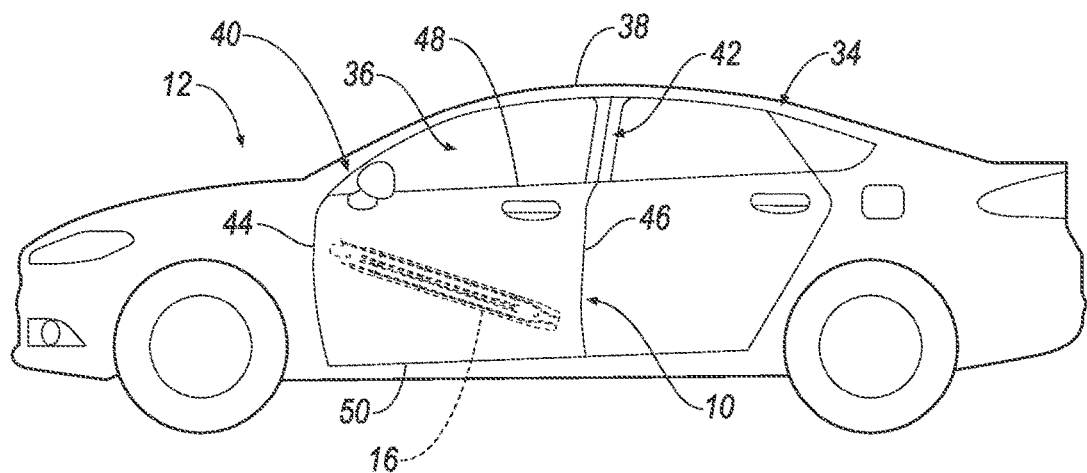
FIG. 1 is a side view of a vehicle including a reinforcing beam, shown in hidden lines, supported by a vehicle door.

With reference to the Figures, wherein like numerals indicate like parts throughout the several views, a vehicle door 10 for a vehicle 12 includes a door inner 14 and a reinforcing beam 16 fixed to the door inner 14. The reinforcing beam 16 includes a first layer 18 and a second layer 20 bonded to each other. The first layer 18 includes a polymer 22 and fibers 24 impregnated in the polymer 22 and extending continuously across the polymer 22 of the first layer 18. The first layer 18 extends along an axis A and has first and second ends 26, 28 spaced from each other on the axis A, i.e., the axis A extends through the first and second ends 26, 28 of the first layer 18. The second layer 20 includes a polymer 22 and fibers 24 impregnated in the polymer 22 and extending continuously across the polymer 22 of the second layer 20. The second layer 20 has first and second ends 30, 32 spaced from each other on the axis A, i.e., the axis A extends through the first and second ends 30, 32 of the second layer 20. The first and second ends 30, 32 of the second layer 20 are each disposed between the first and second ends 26, 28 of the first layer 18 along the axis A.

During a vehicle impact, e.g., a side impact, the vehicle door 10 may be impacted and intrude toward an occupant. When the vehicle door 10 is impacted, the reinforcing beam 16 may provide a counteracting force against the force of the impact to assist in absorbing the energy of the vehicle impact and reducing intrusion. During the vehicle impact, the reinforcing beam 16 may be subject to a bending stress pattern. The reinforcing beam 16 may be subjected to higher stress at certain locations along the reinforcing beam 16. The second layer 20 of the reinforcing beam 16 may be disposed along the axis A such that the second layer 20 is disposed at the higher stress locations. In other words, the second layer 20 may reinforce the first layer 18 to provide an increase in the energy absorption of the reinforcing beam 16 along the second layer 20. Further, because the first layer 18 and the second layer 20 are each formed of polymer 22 and fibers 24 impregnated in the polymer 22, the weight of the reinforcing beam 16 is minimized while maintaining the energy absorption requirements when the reinforcing beam 16 is impacted.

The vehicle 12 may, for example, be any suitable type of automobile. The vehicle 12 may include a vehicle body 34 defining at least one door opening 36, as shown in FIG. 1. The vehicle body 34 may include a roof 38 and a plurality of pillars 40, 42. The pillars 40, 42 may be spaced from each other by the door opening 36. In other words, the pillars\40, 42 may be disposed on opposite sides of the door opening 36. For example, the pillars 40, 42 may include an A-pillar 40 and a B-pillar 42 spaced from the A-pillar 40 on the opposite side of the door opening 36. The pillars may include additional pillars, e.g., a C-pillar (not numbered).

With reference to FIG. 1, the vehicle door 10 may extend across the door opening 36. In other words, the vehicle door 10 may extend from the A-pillar 40 to the B-pillar 42. The vehicle door 10 may be hinged to, i.e., rotate about, any suitable component of the vehicle body 34 defining the door opening 36, e.g., the A-pillar 40, the B-pillar 42, the roof 38, etc.

Figure 2:
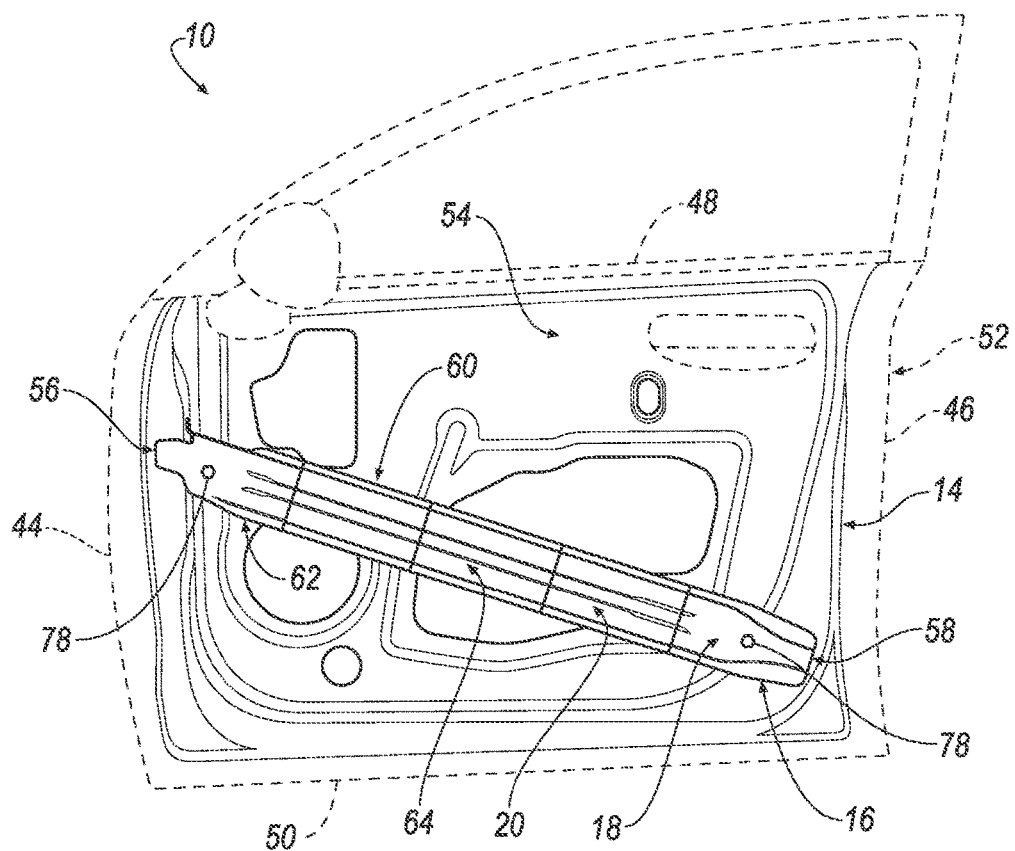
FIG. 2 is a side view of the vehicle door from an exterior of the vehicle, the vehicle door including a door inner and a door outer (shown in hidden lines), and the reinforcing beam mounted to a door inner between the door inner and a door outer.

With reference to FIGS. 1 and 2, the vehicle door 10 may include a front side 44, a rear side 46 spaced from the front side 44, and a top side 48 and a bottom side 50 spaced from each other and extending to the front side 44 and the rear side 46 of the vehicle door 10. The vehicle 12 may include any number of vehicle doors 10, and any one or more of the vehicle doors 10 may include the reinforcing beam 16.

The vehicle door 10 may be any suitable type of door. For example, the vehicle door 10 may be a front driver door, as shown in FIG. 1. As other examples, the vehicle door 10 may be a front passenger door, a rear driver door, a rear passenger door, a sliding door, or any other suitable type of door.

The vehicle door 10 includes the door inner 14 and a door outer 52 attached to the door inner 14. The door outer 52 is fixed to the door inner 14, e.g., may be flanged to the door inner 14. The vehicle door 10 may include trim supported on the door inner 14 and/or the door outer 52. The trim is adjacent an occupant of the vehicle 12 and may be formed, for example, of an underlying plastic, foam, etc., covered by leather, vinyl, etc.

The door inner 14 is disposed between the door outer 52 and the occupant, i.e., on an inboard side of the vehicle door 10. The door inner 14 extends from the front side 44 to the rear side 46, and from the top side 48 to the bottom side 50, as shown in FIG. 2. The door inner 14 may include a plurality of holes (not numbered) for mounting door components, e.g., the reinforcing beam 16, a door latch, a speaker, etc., to the vehicle door 10.

The door outer 52 is spaced from the occupant on the vehicle door 10, e.g., disposed on an outboard side of the vehicle door 10. In other words, as set forth above, the door inner 14 is disposed between the occupant and the door outer 52. The door outer 52 extends from the front side 44 to the rear side 46, and from the top side 48 to the bottom side 50, as shown in FIG. 2. The door outer 52 is fixed to the door inner 14, e.g., by flanging, along the sides of the vehicle door 10. Specifically, the door outer 52 may be fixed to the door inner 14 along the front, rear, and bottom sides 44, 46, 50 of the vehicle door 10.

The door outer 52 and the door inner 14 define a cavity 54 therebetween. In other words, the door outer 52 may be spaced from the door inner 14 between the sides 44, 46, 48, 50 of the vehicle door 10.

With reference to FIG. 2, the reinforcing beam 16 is disposed between the door inner 14 and the door outer 52, e.g., in the cavity 54, and is fixed to the door inner 14. When the reinforcing beam 16 is mounted to the door inner 14, the reinforcing beam 16 may extend generally in a direction from the front side 44 to the rear side 46 of the vehicle door 10. For example, the reinforcing beam 16 may extend obliquely, i.e., diagonally, from each of the front side 44 and the rear side 46 of the vehicle door 10. The reinforcing beam 16 may be fixed to the door inner 14 by fasteners 78, as set forth further below. Additionally, or alternatively, the reinforcing beam 16 may be fixed to the door inner 14 by adhesive.

Figure 3:
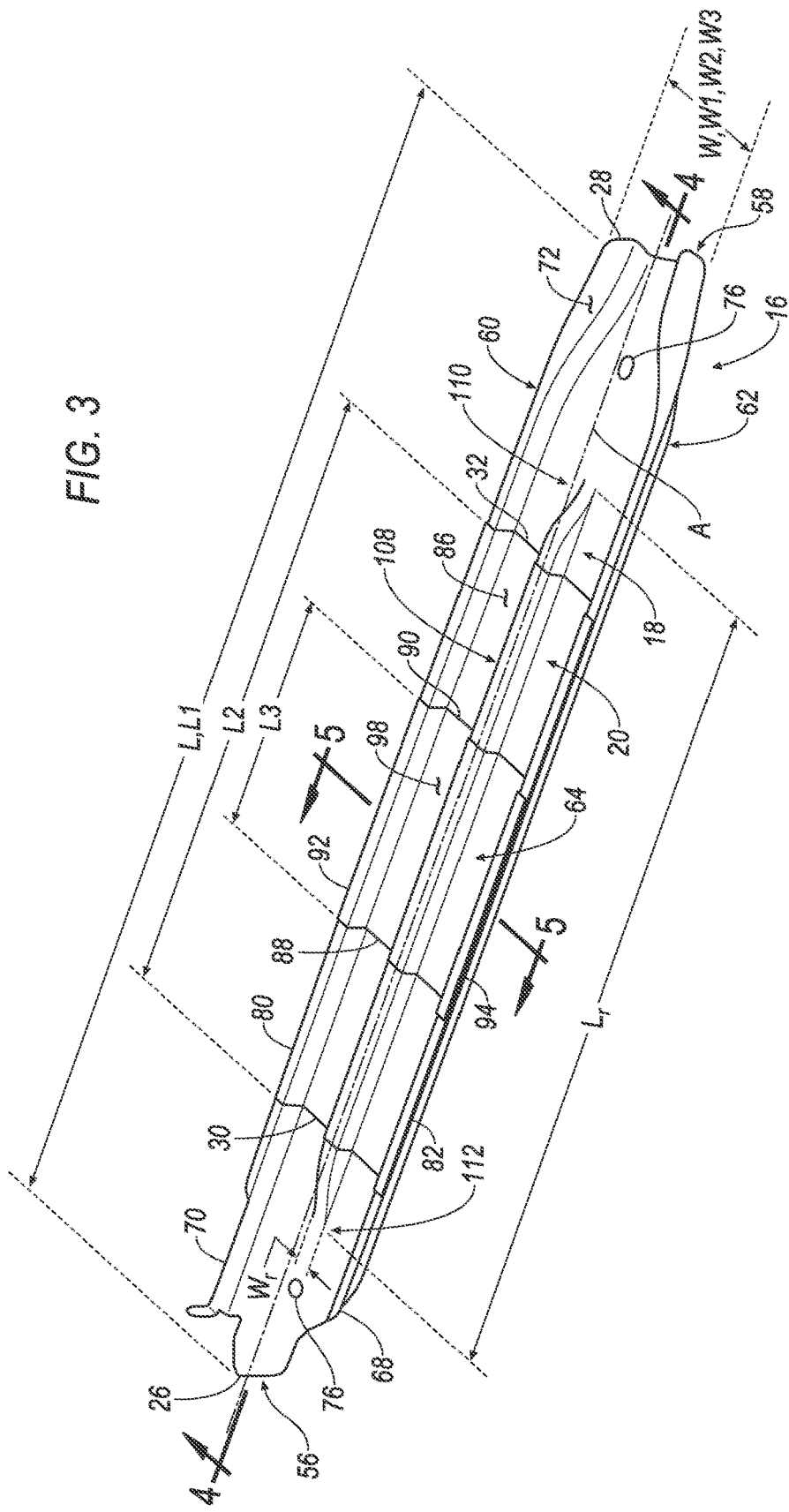
FIG. 3 is a perspective view of the reinforcing beam including a first layer, a second layer bonded to the first layer, a third layer bonded to the second layer, and a ridge extending along an axis on the reinforcing beam.

With reference to FIG. 3, the reinforcing beam 16 may extend to four ends, i.e., is generally rectangular. For example, the reinforcing beam 16 may include a first end 56, a second end 58 spaced from the first end 56 along the axis A, and two side ends 60, 62 spaced from each other and extending to the first end 56 and the second end of the reinforcing beam 16. The reinforcing beam 16 terminates at the ends 56, 58, 60, 62. The reinforcing beam 16 may be elongated along the axis A. In other words, the first end 56 of the reinforcing beam 16 and the second end 58 of the reinforcing beam 16 may be spaced along a length L of the reinforcing beam 16. The two side ends 60, 62 of the reinforcing beam 16 may be spaced along a width W of the reinforcing beam 16. The reinforcing beam 16 may have any suitable length L and width W.

As set forth above, the reinforcing beam 16 may include the first layer 18 and the second layer 20. In addition, the reinforcing beam 16 may include a third layer 64, as shown in FIG. 3, with each of the layers 18, 20, 64 having a different length L1, L2, L3 along the axis A. In addition, the reinforcing beam 16 may include any other suitable number of layers having different lengths along the axis A. Each of the layers 18, 20, 64 has a polymer 22 and fibers 24 impregnated in the polymer 22.

As set forth above, the second layer 20 is bonded to the first layer 18, and the third layer 64 is bonded to the second layer 20. The bonding between the layers 18, 20, 64 may be achieved with an adhesive, an epoxy, by melting the layers 18, 20, 64 together by the application of heat, etc.

Figure 6:
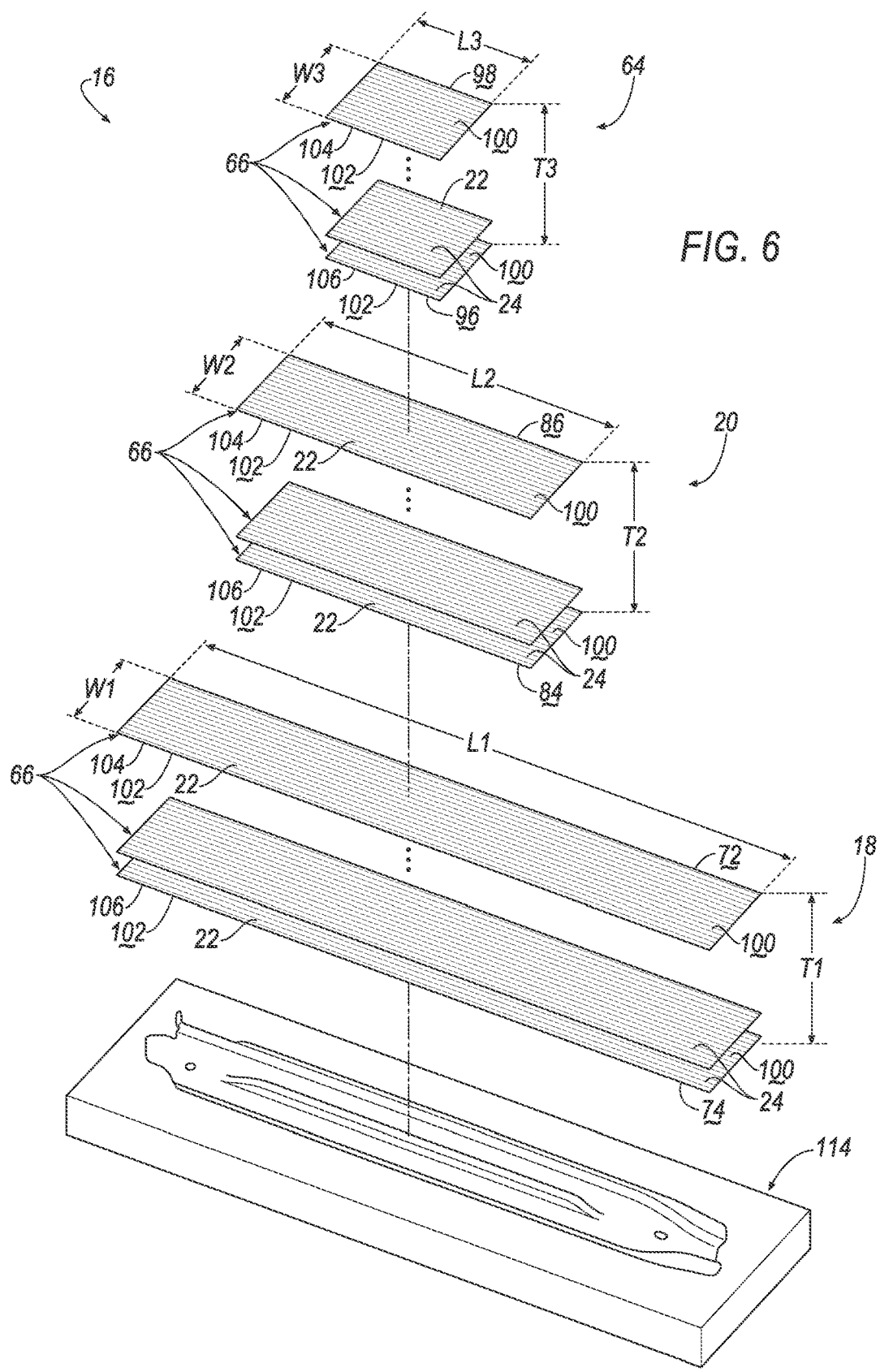
FIG. 6 is an exploded view of a plurality of sheets to be stacked in a mold and bonded together in each of the first layer, the second layer, and the third layer.

As set forth further below, each of the layers, e.g., the first layer 18, the second layer 20, and the third layer 64, may include a plurality of sheets 66 bonded to each other, as shown in FIG. 6. The sheets 66 of each layer 18, 20, 64 may be bonded to each other.

The polymer 22 of the first layer 18, the second layer 20, and the third layer 64 may be the same as each other or different. Likewise, any one of the layers 18, 20, 64 may have sheets 66 of the same or different polymer 22. As an example, the polymer 22 of any of the layers 18, 20, 64 or sheets 66 may be of any suitable type of plastic. For example, the polymer 22 of any of the layers 18, 20, 64 or sheets 66 may be formed of thermoset, such as an epoxy. As another example, the polymer 22 of any of the layers 18, 20, 64 or sheets 66 may be a thermoplastic. Other examples of the polymer 22 of any of the layers 18, 20, 64 include polyester, vinyl ester, nylon, etc. The polymer 22 of the first layer 18 and the polymer 22 of the second layer 20, e.g., adjacent sheets 66 of the first layer 18 and the second layer 20, may be of a type that encourages bonding between the first layer 18 and the second layer 20. The polymer 22 of the second layer 20 and the polymer 22 of the third layer 64, e.g., adjacent sheets 66 of the second layer 20 and the third layer 64, may be of a type that encourages bonding between the second layer 20 and the third layer 64.

The fibers 24 are impregnated in the polymer 22 of each layer 18, 20, 64, as set forth above. For example, the polymer 22 of each layer 18, 20, 64 encompasses the fibers 24 of each layer 18, 20, 64, as shown in FIG. 5. Specifically, in each of the plurality of sheets 66, a portion of the fibers 24 is impregnated in a portion of the polymer 22. In other words, the portion of the fibers 24 in each of the plurality of sheets 66 is encompassed by the portion of the polymer 22 in each of the plurality of sheets 66.

The fibers 24 of each layer, e.g., the first layer 18, the second layer 20, and the third layer 64, may be formed of a same or different material. In other words, the fibers 24 in each of the plurality of sheets 66 in each layer 18, 20, 64 may be formed of a same or different material. The fibers 24 may be formed of any suitable material. For example, the fibers 24 may be carbon fibers. Alternatively, the fibers 24 may be aluminum fibers, glass fibers, or any other suitable type of material.

With continued reference to FIG. 3, the first layer 18 may be elongated along the axis A from the first end 26 to the second end 28 of the first layer 18. In other words, the first end 26 may be longitudinally spaced from the second end 28 of the first layer 18. For example, the first layer 18 may be elongated along a length L1 from the first end 26 to the second end 28 of the first layer 18.

With continued reference to FIG. 3, the first layer 18 includes two side ends 68, 70 spaced from each other and extending from the first end 26 to the second end 28 of the first layer 18. The two side ends 68, 70 of the first layer 18 may each be spaced from the axis A. For example, the two side ends 68, 70 of the first layer 18 may be spaced along a width W1 of the first layer 18.

With continued reference to FIG. 3, the reinforcing beam 16 and the first layer 18 may have the same length and width. In other words, the reinforcing beam 16 and the first layer 18 may have the same ends. For example, the first end 56 of the reinforcing beam 16 may be the same as the first end 26 of the first layer 18. As another example, the second end 28 of the reinforcing beam 16 may be the same as the second end of the first layer 18. As yet another example, the two side ends 60, 62 of the reinforcing beam 16 may be the same as the two side ends 68, 70 of the first layer 18.

With reference to FIG. 4, the first layer 18 may include a top surface 72 and a bottom surface 74 spaced from the top surface 72. The top surface 72 of the first layer 18 abuts the second layer 20. Specifically, the top surface 72 of the first layer 18 is bonded to the second layer 20. When the reinforcing beam 16 is fixed to the vehicle door 10, the bottom surface 74 of the first layer 18 may abut the door inner 14. Each of the top surface 72 and the bottom surface 74 of the first layer 18 may extend generally planar along the axis A. The top surface 72 and the bottom surface 74 of the first layer 18 may extend to the ends 26, 28, 68, 70 of the first layer 18.

With continued reference to FIG. 4, the first layer 18 may include a thickness T1 extending from the bottom surface 74 to the top surface 72 of the first layer 18. In other words, the thickness T1 of the first layer 18 may extend transverse to each of the length L1 and the width W1 of the first layer 18. The first layer 18 may have any suitable thickness.

The polymer 22 of the first layer 18 may extend entirely across the first layer 18. Specifically, the polymer 22 may extend from the first end 26 to the second end 28 of the first layer 18, i.e., along the length L1 of the first layer 18; from one side end 68 to the other side end 70 of the first layer 18, i.e., along the width W1 of the first layer 18; and from the bottom surface 74 to the top surface 72 of the first layer 18, i.e., along the thickness T1 of the first layer 18.

With reference to FIG. 3, the first layer 18 includes holes 76 adjacent to the first end 26 and the second end 28 of the first layer 18. The holes 76 may be disposed between the first and second ends 26, 28 of the first layer 18 and the first and second ends 30, 32 of the second layer 20. For example, the hole 76 adjacent to the first end 26 of the first layer 18 may be disposed between the first end 26 of the first layer 18 and the first end 30 of the second layer 20. Each hole 76 may extend through the first layer 18 transverse to the axis A. In other words, each hole 76 may extend from the top surface 72 to the bottom surface 74 of the first layer 18, e.g., through the thickness T1 of the first layer 18.

With reference to FIG. 2, fasteners 78 may be inserted into the holes 76 to fix the reinforcing beam 16, i.e., the first layer 18, to the door inner 14. Any suitable fastener may be used to fix the first layer 18 to the door inner 14, e.g., screws, bolts, etc.

With reference to FIG. 3, the second layer 20 may be elongated along the axis A from the first end 30 to the second end 32 of the second layer 20. In other words, the first end 30 may be longitudinally spaced from the second end 32 of the second layer 20. For example, the second layer 20 may be elongated along a length L2 from the first end 30 to the second end 32 of the second layer 20. The length L2 of the second layer 20 is less than, i.e., shorter, than the length L1 of the first layer 18. For example, the first and second ends 30, 32 of the second layer 20 may be disposed between the first and second ends 26, 28 of the first layer 18, as set forth above. In other words, the first and second ends 30, 32 of the second layer 20 may each be spaced from the first and second ends 26, 28 of the first layer 18.

With continued reference to FIG. 3, the second layer 20 includes two side ends 80, 82 spaced from each other and extending from the first end 30 to the second end 32 of the second layer 20. The two side ends 80, 82 of the second layer 20 may each be spaced from the axis A. For example, the two side ends 80, 82 of the second layer 20 may be spaced along a width W2 of the second layer 20. The width W2 of the second layer 20 may be the same as the width W1 of the first layer 18. For example, the two side ends 68, 70 of the first layer 18 may abut the two side ends 80, 82 of the second layer 20.

With reference to FIG. 6, the second layer 20 may include a bottom surface 84 abutting the top surface 72 of the first layer 18 and a top surface 86 spaced from the bottom surface 84 of the second layer 20 transverse to the axis A. For example, the bottom surface 84 of the second layer 20 is bonded to the top surface 72 of the first layer 18. Each of the top surface 86 and the bottom surface 84 of the second layer 20 may extend generally planar along the axis A. The top surface 86 and the bottom surface 84 of the second layer 20 may extend to the ends 30, 32, 80, 82 of the second layer 20.

With reference to FIG. 6, the second layer 20 may include a thickness T2 extending from the bottom surface 84 to the top surface 86 of the second layer 20. In other words, the thickness T2 of the second layer 20 may extend transverse to each of the length L2 and the width W2 of the second layer 20. The thickness T1 of the first layer 18 is greater than, i.e., larger, than the thickness T2 of the second layer 20.

The polymer 22 of the second layer 20 may extend entirely across the second layer 20. Specifically, the polymer 22 may extend from the first end 30 to the second end 32 of the second layer 20, i.e., along the length L2 of the second layer 20; from one side end 80 to the other side end 82 of the second layer 20, i.e., along the width W2 of the second layer 20; and from the bottom surface 84 to the top surface 86 of the second layer 20, i.e., along the thickness T2 of the second layer 20.

With reference to FIG. 3, the third layer 64 may include a first end 88 and a second end 90 spaced from the first end 88 along the axis A. The third layer 64 may include a length L3 from the first end 88 to the second end 90 of the third layer 64. The length L3 of the third layer 64 is less than, i.e., shorter than, each of the lengths L1, L2 of the first layer 18 and the second layer 20. For example, the first and second ends 88, 90 of the third layer 64 may be disposed between the first and second ends 30, 32 of the second layer 20. In other words, the first and second ends 88, 90 of the third layer 64 may each be spaced from the first and second ends 30, 32 of the second layer 20.

With continued reference to FIG. 3, the third layer 64 includes two side ends 92, 94 spaced from each other and extending from the first end 88 to the second end 90 of the third layer 64. The two side ends 92, 94 of the second layer 20 may each be spaced from the axis A. For example, the two side ends 92, 94 of the third layer 64 may be spaced along a width W3 of the third layer 64. The width W3 of the third layer 64 may be the same as each of the widths W1, W2 of the first layer 18 and the second layer 20. For example, the two side ends 92, 94 of the third layer 64 may abut the two side ends 80, 82 of the second layer 20.

With reference to FIG. 6, the third layer 64 may include a bottom surface 96 abutting the top surface 86 of the second layer 20 and a top surface 98 spaced from the bottom surface 96 of the third layer 64 transverse to the axis A. For example, the bottom surface 96 of the third layer 64 is bonded to the top surface 86 of the second layer 20. In other words, the second layer 20 is disposed between the first layer 18 and the third layer 64, as shown in FIG. 6. Specifically, the second layer 20 is sandwiched between the top surface 72 of the first layer 18 and the bottom surface 96 of the third layer 64. Each of the top surface 98 and the bottom surface 96 of the third layer 64 may extend generally planar along the axis A. The top surface 98 and the bottom surface 96 of the third layer 64 may extend to the ends 88, 90, 92, 94 of the third layer 64.

With reference to FIG. 6, the third layer 64 may include a thickness T3 extending from the bottom surface 96 to the top surface 98 of the third layer 64. In other words, the thickness T3 of the third layer 64 may extend transverse to each of the length L3 and the width W3 of the third layer 64. The thickness T1 of the first layer 18 is greater than, i.e., larger, than the thickness T3 of the third layer 64. The third layer 64 and the second layer 20 may have a same or different thickness.

The polymer 22 of the third layer 64 may extend entirely across the third layer 64. Specifically, the polymer 22 may extend from the first end 88 to the second end 90 of the third layer 64, i.e., along the length L3 of the third layer 64; from one side end 92 to the other side end 94 of the third layer 64, i.e., along the width W3 of the third layer 64; and from the bottom surface 96 to the top surface 98 of the third layer 64, i.e., along the thickness T3 of the third layer 64.

The plurality of sheets 66 of each layer 18, 20, 64 may be stacked on each other in a direction transverse to the axis A. For example, the plurality of sheets 66 of each layer 18, 20, 64 may be stacked along the thickness T1, T2, T3 of each layer 18, 20, 64. In other words, the plurality of sheets 66 of each layer 18, 20, 64 may be stacked from the bottom surface 74, 84, 96 to the top surface 72, 86, 98 of each layer 18, 20, 64.

The plurality of sheets 66 of each layer 18, 20, 64 may extend to each end of each layer 18, 20, 64. For example, the plurality of sheets 66 of each layer 18, 20, 64 may extend from the first end 26, 30, 88 to the second end 28, 32, 90 of each layer 18, 20, 64, i.e., along the length L1, L2, L3 of each layer 18, 20, 64, and from one side end 68, 80, 92 to the other side end 70, 82, 94 of each layer 18, 20, 64, i.e., along the width W1, W2, W3 of each layer 18, 20, 64. In other words, the plurality of sheets 66 of each layer 18, 20, 64 may terminate at the ends of each layer 18, 20, 64. Each of the sheets 66 of each layer 18, 20, 64 may include a top surface 100 and a bottom surface 102 spaced from the top surface 100 transverse to the axis A. The top surface 100 of one of the sheets 66 may be bonded to the bottom surface 102 of another sheet 66.

As set forth above, the reinforcing beam 16 may have the same ends as the first layer 18. In other words, the plurality of sheets 66 of the first layer 18 may extend to the ends 56, 58, 60, 62 of the reinforcing beam 16. For example, the plurality of sheets 66 of the first layer 18 may extend along the length L of the reinforcing beam 16, e.g., 1 meter, and long the width W of the reinforcing beam 16, e.g., 50 cm.

The plurality of sheets 66 may include a thickness Ts extending from the bottom surface 102 to the top surface 100 of each sheet 66. The plurality of sheets 66 may have a same or different thickness. For example, the thickness of each sheet 66 may be between 0.1625 and 0.3250 mm.

As set forth above, the plurality of sheets 66 may be stacked along the thickness T1, T2, T3 of each layer 18, 20, 64. In other words, the thickness T1, T2, T3 of each layer 18, 20, 64 may be comprised of the thickness Ts of each of the sheets 66 in that layer. For example, the first layer 18 may include eighteen sheets 66, and the second layer 20 and the third layer 64 may each include six sheets 66. In other words, the thickness T of the reinforcing beam 16 may vary from eighteen sheets 66 thick along the first layer 18 to thirty sheets 66 thick along the third layer 64.

With reference to FIG. 6, the plurality of sheets 66 of each layer 18, 20, 64 includes at least a top sheet 104 adjacent to the top surface 72, 86, 98 of each layer 18, 20, 64 and a bottom sheet 106 adjacent to the bottom surface 74, 84, 96 of each layer 18, 20, 64. The top sheet 104 of each layer 18, 20, 64 has the same top surface as each layer 18, 20, 64, and the bottom sheet 106 of each layer 18, 20, 64 has the same bottom surface as each layer 18, 20, 64. For example, the top surface 100 of the top sheet 104 of the first layer 18 is the same as the top surface 72 of the first layer 18. As another example, the bottom surface 102 of the bottom sheet 106 of the first layer 18 is the same as the bottom surface 74 of the first layer 18.

Each of the sheets 66 of each layer 18, 20, 64 may include the portion of the polymer 22 of that layer. In other words, the polymer 22 of each layer 18, 20, 64 may be comprised of each of the sheets 66 of that layer. Additionally, each of the sheets 66 of each layer 18, 20, 64 may include the portion of the fibers 24 of that layer. In other words, the fibers 24 of each layer 18, 20, 64 may constitute the fibers 24 of each of the sheets 66 of that layer.

As set forth above, the fibers 24 of each layer 18, 20, 64 may extend continuously across each layer 18, 20, 64, e.g., each sheet 66 may be of the type referred to as "continuous fiber reinforced thermoplastic." Specifically, each fiber 24 of each of the plurality of sheets 66 may extend continuously across each layer 18, 20, 64. In other words, each fiber 24 of each sheet 66 of one layer may extend from one end of that layer to another end of that layer. For example, the fibers 24 of one sheet 66 of one layer 18, 20, 64 may extend from the first end 26, 30, 88 to the second end 28, 32, 90 of that layer. As another example, the fibers 24 of another sheet 66 of one layer 18, 20, 64 may extend from the first end 26, 30, 88 to one side end 68, 80, 92 of that layer.

Figure 7:
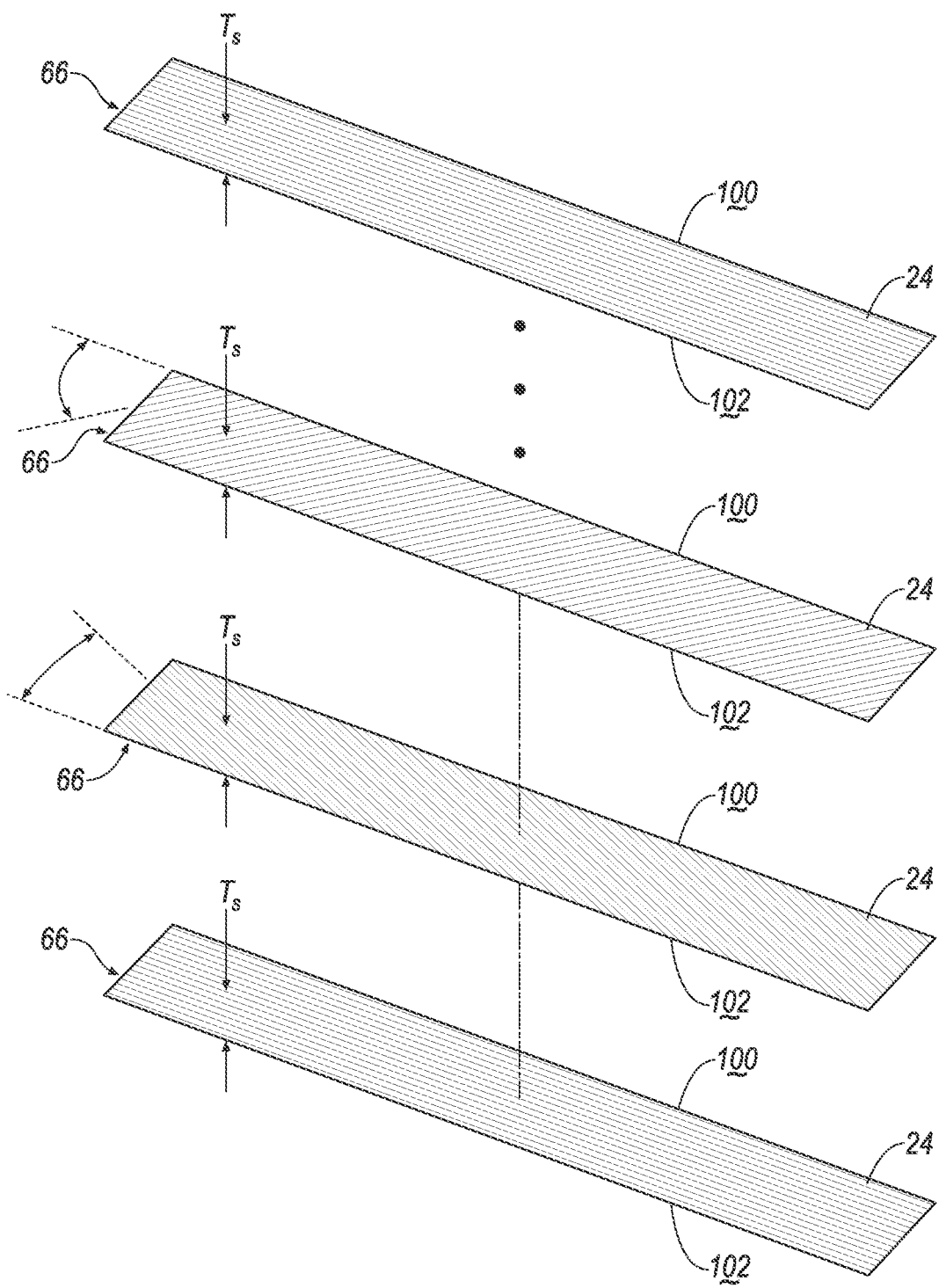
FIG. 7 is an exploded view of the plurality of sheets with at least one sheet including fibers extending parallel to the axis of the reinforcing beam and at least one sheet including fibers extending transverse to the axis.

With reference to FIG. 7, the fibers 24 of each sheet 66 in each layer 18, 20, 64 may extend in parallel with each other across each sheet 66. In other words, the fibers 24 of each sheet 66 in each layer 18, 20, 64 may be unidirectional with each other and extend from one end of that layer to another end of that layer. The fibers 24 in at least one of the sheets 66 of each layer 18, 20, 64 may extend parallel to the axis A. Additionally, the fibers 24 in at least one of the sheets 66 of each layer 18, 20, 64 may extend transverse to the axis A. In other words, the fibers 24 may extend in the sheets 66 oblique to the axis A. For example, the fibers 24 in one of the sheets 66 of each layer 18, 20, 64 may extend at an angle 30 degrees from the axis A. Alternatively, the fibers 24 in one of the sheets 66 of each layer 18, 20, 64 may extend at any suitable angle obliquely to the axis A, e.g., 45 degrees, 60 degrees, etc.

With reference to FIG. 4, the reinforcing beam 16 may include a thickness T extending from the bottom surface 74 of the first layer 18 to the top surfaces 72, 86, 98 of each layer, e.g., the first layer 18, second layer 20, and third layer 64. In other words, the thickness T of the reinforcing beam 16 may vary along the length L of the reinforcing beam 16. For example, the thickness T of the reinforcing beam 16 may gradually increase along the length L of the reinforcing beam 16, i.e., along the axis A, from each end 56, 58 of the reinforcing beam 16 to the third layer 64. In other words, the thickness T of the reinforcing beam 16 includes the thicknesses T1, T2, T3 of each layer, e.g., the first layer 18, the second layer 20, and the third layer 64, of the reinforcing beam 16. As one example, the thickness T of the reinforcing beam 16 at the first layer 18 may be 3.7-4.1 mm, e.g., 3.9 mm; the thickness T of the reinforcing beam 16 at the second layer 20 may be 5.0-5.4 mm, e.g., 5.2 mm; and the thickness T of the reinforcing beam 16 at the third layer 64 may be 6.3-6.7 mm, e.g., 6.5 mm.

With reference to FIG. 3, the reinforcing beam 16 includes a ridge 108 extending along the axis A. For example, the ridge 108 may extend along each of the layers 18, 20, 64 of the reinforcing beam 16. The ridge 108 may be on the axis A. Alternatively, the ridge 108 may be spaced from the axis A. In other words, the ridge 108 may be disposed at any suitable location along the width W of the reinforcing beam 16.

The ridge 108 may include a length Lr elongated between a first end 110 and a second end 112 disposed between the first and second ends 56, 58 of the reinforcing beam 16. In other words, the ridge 108 may be elongated partially along the length L of the reinforcing beam 16, as shown in FIGS. 3 and 4. The ridge 108 may include a width Wr extending transverse to the axis A between the two side ends 60, 62 of the reinforcing beam 16, i.e., the ridge 108 extends partially along the width W of the reinforcing beam 16, as shown in FIG. 5. The ridge 108 may include a thickness Tr extending from the bottom surface 74 of the first layer 18 to the top surfaces 72, 86, 98 of each layer 18, 20, 64. In other words, the ridge 108 may have the same thickness as the reinforcing beam 16, as shown in FIG. 5.

With reference to FIG. 6, the plurality of sheets 66 of each of the layers, e.g., the first layer 18, the second layer 20, and the third layer 64, may be stacked in a mold 114 having a desired shape, e.g., the reinforcing beam 16. At the time the sheets 66 are stacked into the mold 114, the polymer 22 of the plurality of sheets 66 may be partially uncured. The sheets 66 may be compressed in the mold 114 to achieve the desired shape, e.g., the reinforcing beam 16, prior to being completely cured. After curing, the reinforcing beam 16, i.e., the plurality of sheets 66, may have a desired rigidity.

In operation, the reinforcing beam 16 is disposed between the door inner 14 and the door outer 52 of the vehicle door 10, e.g., in the cavity 54, and is fixed to the door inner 14. During a vehicle impact, e.g., a side impact, the vehicle door 10 may be impacted. When the vehicle door 10 is impacted, the reinforcing beam 16 may absorb the energy from the impact to reduce the intrusion of the vehicle door 10 towards the occupant. In other words, the reinforcing beam 16 may act as a counterforce to the impact to reduce intrusion of the vehicle door 10 towards the occupant. The energy absorbing requirements of the reinforcing beam 16 may vary along the length L of the reinforcing beam 16, e.g., along each of the layers 18, 20, 64 of the reinforcing beam 16. The first layer 18 of the reinforcing beam 16 may extend along the length L of the reinforcing beam 16. The second layer 20 of the reinforcing beam 16 may be disposed along the axis A and bonded to the first layer 18 to increase the energy absorbing capabilities of the reinforcing beam 16 along the second layer 20 as compared to the energy absorbing capabilities along only the first layer 18. Similarly, the third layer 64 of the reinforcing beam 16 may be disposed along the axis A and bonded the second layer 20 to further increase the energy absorbing capabilities of the reinforcing beam 16 along the third layer 64 as compared to the energy absorbing capabilities along each of the first layer 18 and the second layer 20. The layers 18, 20, 64 of the reinforcing beam 16 may be disposed in such a way as to position the third layer 64 adjacent to the highest impact force on the reinforcing beam 16, i.e., the location with the highest energy absorption requirements. In other words, the reinforcing beam 16 may absorb more energy when more layers are impacted. The fibers 24 impregnating the polymer 22 of each layer 18, 20, 64 assist in reducing the cost and weight of the reinforcing beam 16 while maintaining the energy absorbing requirements.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle door comprising:
    a door inner;
    a reinforcing beam fixed to the door inner;
    the reinforcing beam including a first layer and a second layer bonded to each other;
    the first layer including a polymer and fibers impregnated in the polymer and each of the fibers extending continuously across the polymer of the first layer, and the second layer including a polymer and fibers impregnated in the polymer and each of the fibers extending continuously across the polymer of the second layer;
    the first layer extending along an axis and having first and second ends spaced from each other on the axis;
    the second layer having first and second ends spaced from each other on the axis, the first and second ends of the second layer each being disposed between the first and second ends of the first layer along the axis; and
    the reinforcing beam including a third layer bonded to the second layer, the third layer having first and second ends spaced from each other along the axis, wherein the first and second ends of the third layer are each disposed between the first and second ends of the second layer along the axis.

2. The vehicle door according to claim 1, wherein the first layer is elongated along the axis, and the second layer is elongated along the axis.

3. The vehicle door according to claim 1, wherein the polymer of the first layer extends from the first end to the second end of the first layer, and the polymer of the second layer extends from the first end to the second end of the second layer.

4. The vehicle door according to claim 1, wherein the first layer includes a plurality of sheets bonded to each other and each including a portion of the polymer of the first layer and a portion of the fibers of the first layer, and wherein the second layer includes a plurality of the sheets bonded to each other and each including a portion of the polymer of the second layer and a portion of the fibers of the second layer.

5. The vehicle door according to claim 4, wherein the fibers of each sheet in the first layer extend in parallel with each other, and the fibers of each sheet in the second layer extend in parallel with each other.

6. The vehicle door according to claim 4, wherein the fibers in at least one of the sheets of the first layer or the second layer extend parallel to the axis.

7. The vehicle door according to claim 6, wherein the fibers in at least one of the sheets of the first layer or the second layer extend transverse to the axis.

8. The vehicle door according to claim 4, wherein the sheets of the first layer extend from the first end to the second end of the first layer, and the sheets of the second layer extend from the first end to the second end of the second layer.

9. The vehicle door according to claim 1, wherein the first layer includes holes adjacent to the first end and the second end of the first layer, and wherein fasteners fix the first layer to the door inner through the holes.

10. The vehicle door according to claim 1, wherein the reinforcing beam includes a ridge extending along the axis, the ridge extending along the first layer and the second layer.

11. The vehicle door according to claim 1, wherein the first layer and the second layer each include a thickness, the thickness of the first layer being greater than the thickness of the second layer.

12. The vehicle door according to claim 1, wherein the third layer includes a polymer and fibers impregnated in the polymer, the fibers extending in parallel with each other and extending continuously across the polymer of the third layer.

13. The vehicle door according to claim 1, wherein the second layer is disposed between the first layer and the third layer.

14. The vehicle door according to claim 1, wherein the first layer includes two side ends spaced from each other and extending from the first end to the second end of the first layer, and wherein the second layer includes two side ends spaced from each other and extending from the first end to the second end of the second layer, wherein the two sides ends of the first layer abut the two side ends of the second layer.

15. A vehicle door reinforcing beam comprising:

a first layer and a second layer bonded to each other;

the first layer including a polymer and fibers impregnated in the polymer and each of the fibers extending continuously across the polymer of the first layer, and the second layer including a polymer and fibers impregnated in the polymer and each of the fibers extending continuously across the polymer of the second layer;

the first layer extending along an axis and having first and second ends spaced from each other on the axis;

the second layer having first and second ends spaced from each other on the axis, the first and second ends of the second layer each being disposed between the first and second ends of the first layer along the axis; and the reinforcing beam including a third layer bonded to the second layer, the third layer having first and second ends spaced from each other along the axis, wherein the first and second ends of the third layer are each disposed between the first and second ends of the second layer along the axis.

16. The vehicle door reinforcing beam according to claim 15, wherein the first layer is elongated along the axis, and the second layer is elongated along the axis.

17. The vehicle door reinforcing beam according to claim 15, wherein the first layer includes a plurality of sheets bonded to each other and each including a portion of the polymer of the first layer and a portion of the fibers of the first layer, and wherein the second layer includes a plurality of the sheets bonded to each other and each including a portion of the polymer of the second layer and a portion of the fibers of the second layer.

18. The vehicle door reinforcing beam according to claim 17, wherein the fibers of each sheet in the first layer extend in parallel with each other, and the fibers of each sheet in the second layer extend in parallel with each other.

19. The vehicle door reinforcing beam according to claim 17, wherein the fibers in at least one of the sheets of the first layer or the second layer extend parallel to the axis.

20. A vehicle door comprising:

a door inner;

a reinforcing beam fixed to the door inner;

the reinforcing beam including a first layer and a second layer bonded to each other;

the first layer including a polymer and fibers impregnated in the polymer and each of the fibers extending continuously across the polymer of the first layer, and the second layer including a polymer and fibers impregnated in the polymer and each of the fibers extending continuously across the polymer of the second layer;

the first layer extending along an axis and having first and second ends spaced from each other on the axis;

the second layer having first and second ends spaced from each other on the axis, the first and second ends of the second layer each being disposed between the first and second ends of the first layer along the axis; and wherein the first layer includes a plurality of sheets bonded to each other and each including a portion of the polymer of the first layer and a portion of the fibers of the first layer, and wherein the second layer includes a plurality of the sheets bonded to each other and each including a portion of the polymer of the second layer and a portion of the fibers of the second layer.

* * * * *

UNITED STATES PATENT AND TRADEMARK OFFICE
CERTIFICATE OF CORRECTION

PATENT NO.        : 10,099,541 B2
APPLICATION NO.   : 15/357183
DATED             : October 16, 2018
INVENTOR(S)       : Mohamed Ridha Baccouche et al.

Page 1 of 1

It is certified that error appears in the above-identified patent and that said Letters Patent is hereby corrected as shown below:

In the Claims

Column 10, Line 64 – replace "sides" with --side--.

Signed and Sealed this
Third Day of November, 2020

Andrei Iancu
*Director of the United States Patent and Trademark Office*